(No Model.)
R. H. HUNSTOCK.
APPARATUS FOR MAKING SIRUPS.
No. 523,529. Patented July 24, 1894.
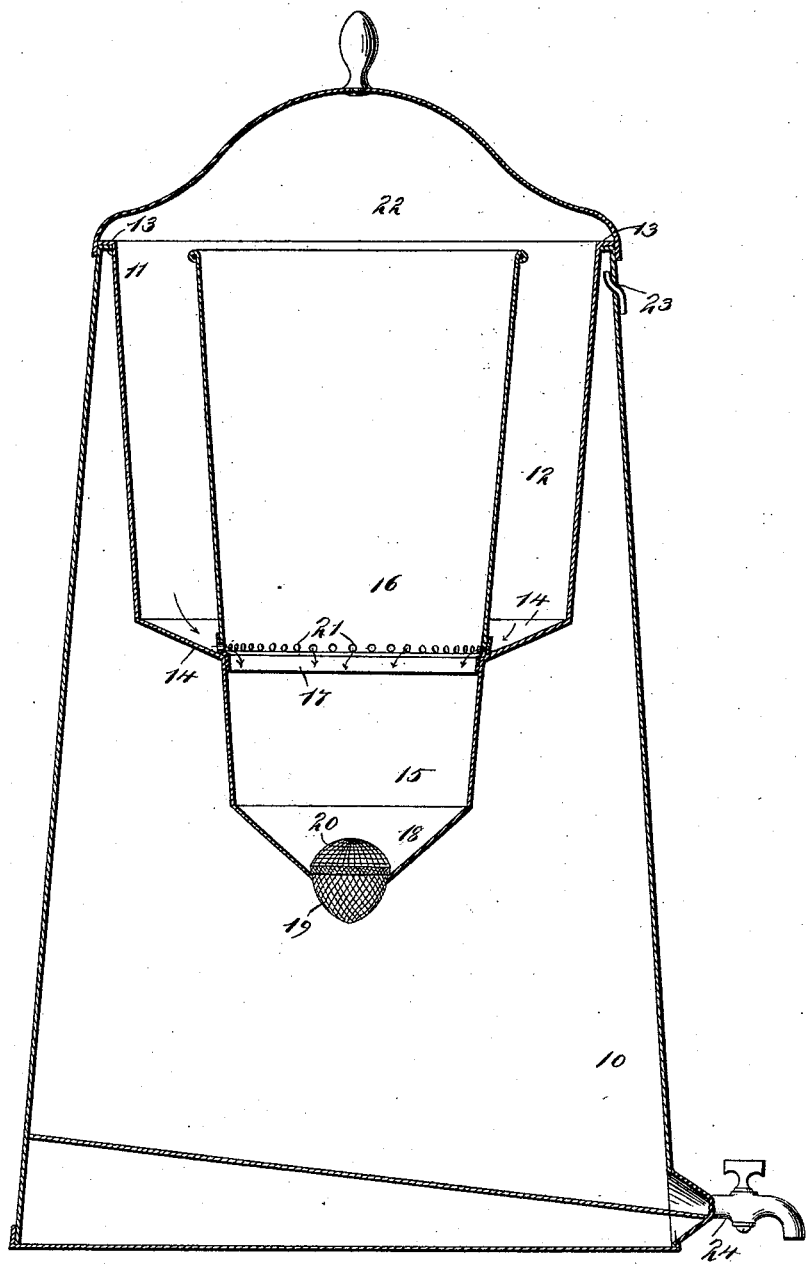
WITNESSES:
John A. Rennie
C. Sedgwick
INVENTOR
R. H. Hunstock
BY
Munn & Co
ATTORNEYS.

UNITED STATES PATENT OFFICE.

ROBERT H. HUNSTOCK, OF HANNIBAL, MISSOURI.

APPARATUS FOR MAKING SIRUPS.

SPECIFICATION forming part of Letters Patent No. 523,529, dated July 24, 1894.

Application filed October 23, 1893. Serial No. 488,918. (No model.)

*To all whom it may concern:*

Be it known that I, ROBERT H. HUNSTOCK, of Hannibal, in the county of Marion and State of Missouri, have invented certain new and useful Improvements in Apparatus for Making Sirups, of which the following is a full, clear, and exact description.

My invention relates to improvements in making sirups such as simple medicinal and fruit sirups; and the object of my invention is to produce a simple apparatus by which sirups of this nature may be made by cold percolation without the necessity of heating any of the ingredients, to the end that a perfectly clear and pure sirup may be produced, also to provide a very simple and convenient apparatus by means of which just the required quantity of sugar may be easily applied to make a given quantity of sirup, and further to arrange the apparatus so that it may be easily cleansed, the sugar and menstruum easily inserted and the sirup properly filtered and clarified.

To these ends my invention consists of an apparatus which will be hereinafter described and claimed.

Reference is to be had to the accompanying drawing, forming a part of this specification, in which the figure is a vertical cross section of the apparatus embodying my invention.

The apparatus has a main vessel 10, which preferably tapers toward the top and which serves as a sirup reservoir, and this vessel has preferably at the top an in-turned flange 11 on which rests the out-turned flange 13 of the menstruum cup or jacket 12, which cup or jacket has an inwardly projecting annular ledge 14 merging in the reduced lower end 15 of the cup, this reduced end serving as the lower section of the sugar receptacle, the upper section 16 of which is open at the top and provided with a flange 17 adapted to fit snugly in the lower section 15, as shown clearly in the drawing.

The lower section of the sugar receptacle has a tapering bottom 18 in an opening of which rests and fits snugly the straining cup 19, which is of suitable gauze so that the sirup may percolate through it, and which has a removable cover 20.

The upper section 16 of the sugar receptacle is provided with numerous perforations 21, which come opposite the lower portion of the ledge 14 so that the menstruum trickles through the perforations and percolates downward through the sugar and the clarifying material in the strainer cup 19.

The vessel 10 has its top closed by a removable cover 22, is provided near the top with a suitable vent 23 and has near the bottom a faucet 24 through which the sirup may be withdrawn.

When the apparatus is used, the cup 19 is filled with suitable filtering and clarifying material, the necessary quantity of sugar is placed in the sugar receptacle and the required amount of menstruum poured into the cup or jacket 12. When it is desired to prepare ordinary sirup, that is, a saturated solution of sugar, the menstruum is water. In the case of making sirup of strawberries, the menstruum would be properly prepared strawberry juice. The filtering material also differs according to the character of the preparation, sterilized sponge being preferred in the case of simple sirup and fruit sirups, while when making medicinal sirups, filter-pulp, felt and absorbent cotton are used. Other materials, such as charcoal, may also be employed. The apparatus is then covered up and the material left to work automatically. The menstruum gradually trickles through the perforations 21 and passes downward and inward through the sugar and filtering material, taking up sufficient sugar to form the sirup and dropping clear and pure from the cup 19.

It will be observed that no heating is necessary, that the apparatus is very simple, and that the making of sirup may be very economically and expeditiously carried on.

Having thus described my invention, I claim as new and desire to secure by Letters Patent—

1. The herein-described apparatus, comprising a sirup reservoir, a menstruum jacket suspended within the reservoir and provided with a reduced lower end carrying a strainer, and an inner section fitting into the reduced end of the jacket and provided near its lower end with perforations connecting with the jacket, while the upper portion of the removable section has imperforate walls substantially as described.

2. The herein-described apparatus, comprising a sirup reservoir, a menstruum jacket suspended within the reservoir and having an inwardly projecting ledge merging in a depending end forming part of a sugar receptacle, a strainer cup held in the said depending end, and an inner top section adapted to form a continuation of said depending end and provided near its lower end with perforations connecting with the menstruum jacket, substantially as described.

ROBERT H. HUNSTOCK.

Witnesses:
AUG. F. HERRMANN,
M. CASWELL LEWIS.